Oct. 27, 1942. M. R. ALLEN 2,299,783
TREATMENT OF SUGAR SOLUTIONS
Filed May 31, 1940 2 Sheets-Sheet 2

INVENTOR
Marshall R. Allen

Patented Oct. 27, 1942

2,299,783

UNITED STATES PATENT OFFICE 2,299,783

TREATMENT OF SUGAR SOLUTIONS

Marshall R. Allen, Findlay, Ohio

Application May 31, 1940, Serial No. 338,105

7 Claims. (Cl. 127—61)

This invention relates generally to the treatment of sugar solutions and more particularly to the treatment of such solutions containing alkaline earth metal salts to inhibit the formation of scale on surfaces in contact with said solutions during evaporation.

Figure 1:
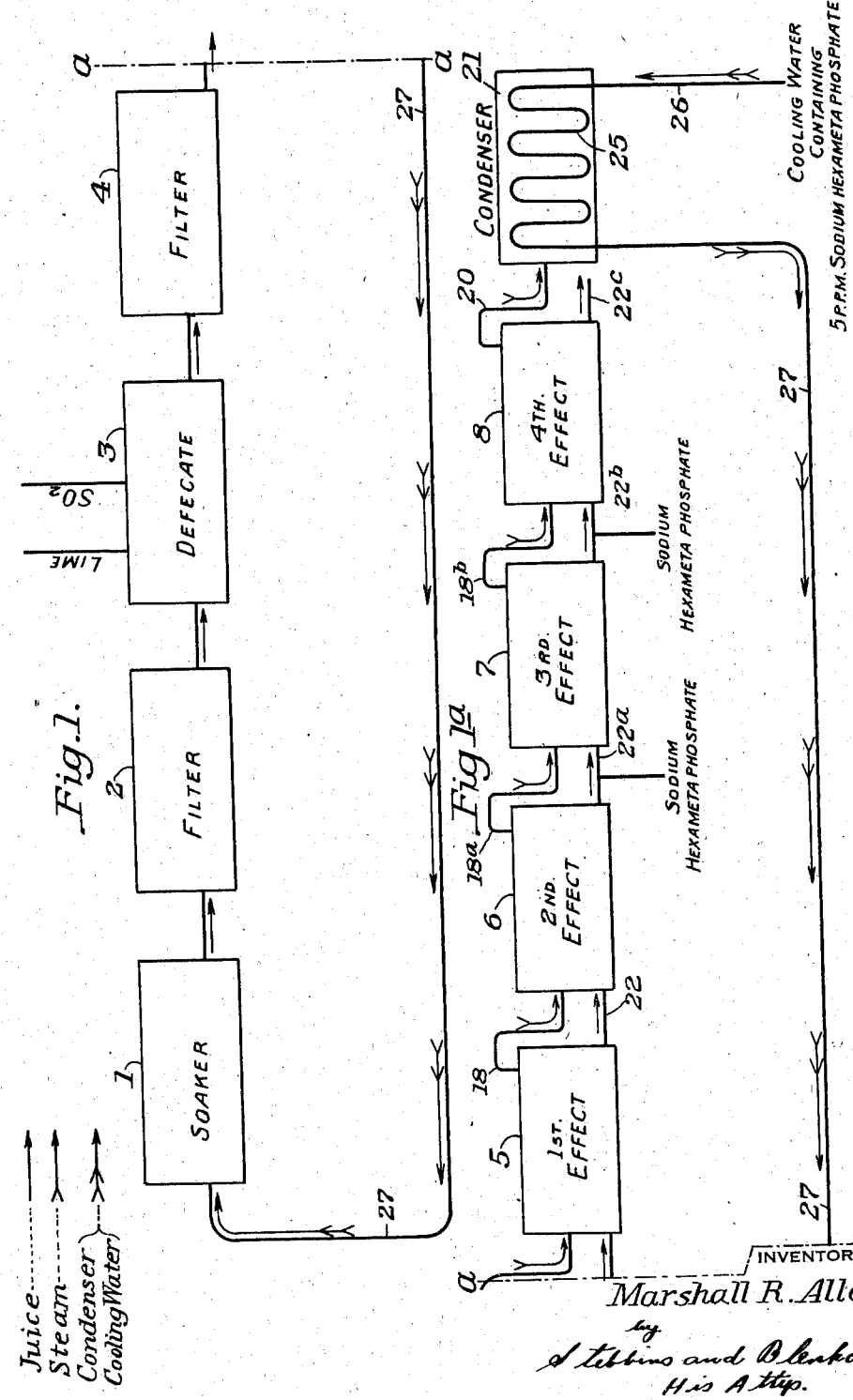
Figure 2:
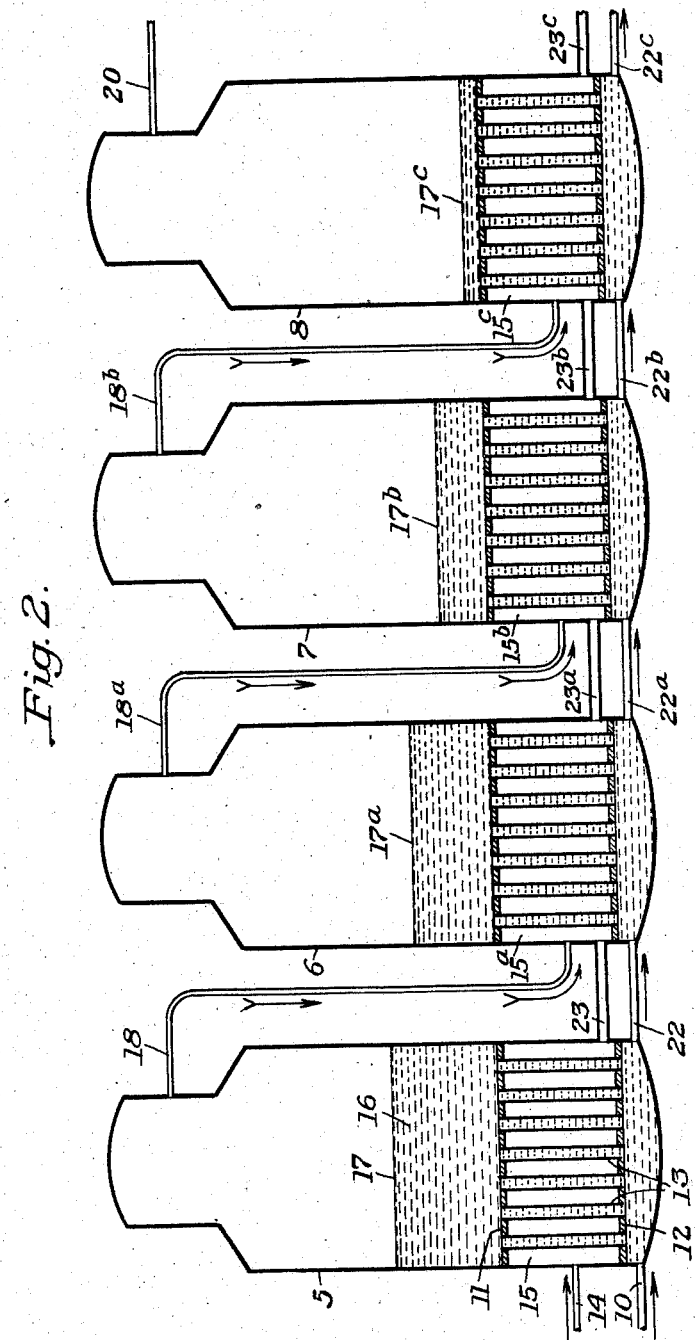

In the accompanying drawings, which illustrate a preferred embodiment of my invention:

Figs. 1 and 1a, taken together and joined along the line a—a, constitute a flow sheet which illustrates in a diagrammatic manner one way of carrying out my process; and Fig. 2 is a diagrammatic illustration of a quadruple effect evaporator used in concentrating the sugar solution.

When the liquor or solution obtained by soaking the sugar beets or the juice expressed from sugar cane is evaporated following defecation, considerable difficulty is always experienced due to the formation of scale on the heat transfer surfaces of the evaporators. This scale usually consists predominantly of calcium sulphate but may contain calcium oxalate, calcium sulphite, calcium carbonate or the corresponding magnesium salts, as well as various organic compounds. The sugar solution contains considerable amounts of calcium and magnesium salts derived from the sugar beets or from the sugar cane. In addition, it is common practice in the defecation or purification of the juices to add lime, in order to coagulate various albuminous materials. A certain proportion of the lime salts thus formed are carried through the process and cause trouble, due to scale formation on the surfaces of the evaporator with which the solution contacts. It is an object of the present invention to inhibit the deposition of salts of calcium and the other alkaline earth metals, as well as salts of magnesium.

Previous attempts have been made to decrease the formation of scale in the evaporators by adding various materials in the defecation process. One of these has involved the addition of orthophosphoric acid or its salts to the thin juice in an attempt to precipitate all the calcium in the form of calcium phosphate before the juice enters the evaporators. Another method consists in adding soda ash between the different stages of evaporation in an attempt to precipitate the calcium salts as carbonate with the expectation that this would result in somewhat less scale formation than would be the case if the calcium sulphate was allowed to deposit on the surfaces. Neither of these methods has proved entirely successful. They are both open to the objection that relatively large amounts of added materials are required for taking care of the calcium and magnesium. In these cases, it was necessary to add an amount of phosphoric acid or soda ash which was stoichiometrically sufficient for causing the precipitation of the calcium and magnesium. This necessarily involved the addition of large quantities of these materials and made the processes quite expensive.

For the sake of brevity, I shall refer to calcium and its salts in the further description of the process, it being understood that magnesium and its salts act similarly in their reactions with various materials and in their tendency to form scale during evaporation of the sugar solution. As contrasted with the relatively large amounts of reagents required to precipitate the calcium according to prior methods, I have found that I may prevent or materially decrease the amount of scale formed during evaporation of the juice by providing in the juice a relatively small amount of certain materials. I have found that this result may be accomplished by providing in the juice a few parts per million based on the weight of the juice of a molecularly dehydrated alkali-metal phosphate. These phosphates are preferably added to the sugar solution during or between stages of evaporation thereof but they may be added, as will be explained more fully hereinafter, to the condenser water used in condensing the steam from the last effect evaporator. This condenser water containing the molecularly dehydrated phosphate is then returned to the soaker for extracting further quantities of sugar from the beets or sugar cane to make further quantities of sugar solution, which is then purified and evaporated. I prefer to add molecularly dehydrated phosphate in very small amounts, such as of the order of 2 P. P. M. to 10 P. P. M. based on the weight of the thin sugar solution entering the first effect evaporator. This amount is far below the stoichiometric amount which would be required to precipitate the calcium salts from the solution. I have found that the presence of these very small amounts of molecularly dehydrated phosphates prevents or greatly decreases the precipitation of calcium sulphate, calcium oxalate, calcium carbonate, calcium sulphite and other calcium salts which would otherwise form scale on the surfaces of the evaporator.

The preferred molecularly dehydrated alkali-metal phosphate is the glassy water soluble metaphosphate commonly known as "Graham's salt" or sodium hexametaphosphate. Sodium hexametaphosphate is a glassy material having a ratio of $Na_2O$ to $P_2O_5$ of 1:1. It will be understood that sodium hexametaphosphate is given as representative of the family of glassy molecularly dehydrated alkali-metal phosphates and that other glassy molecularly dehydrated alkali-metal phosphates having a ratio of $Na_2O$ to $P_2O_5$ between 0.9:1 and 1.7:1, such as the so-called sodium tetraphosphate $Na_6P_4O_{13}$, with a ratio of $Na_2O$ to $P_2O_5$ of 1.5:1, or the so-called sodium decaphosphate $Na_{12}P_{10}O_{31}$, with a ratio of $Na_2O$ to $P_2O_5$ of 1.2:1, may be used in place of or in addition to sodium hexametaphosphate. All of these glassy molecularly dehydrated alkali-metal phosphates have properties which are similar to one another, although differing somewhat in their effectiveness. In place of or in addition to the sodium hexametaphosphate or the other glassy molecularly dehydrated alkali-metal phosphates, I may use the alkali-metal tripolyphosphates—for example, sodium tripolyphosphates $Na_5P_3O_{10}$—or the alkali-metal pyrophosphates—for example, tetra-sodium pyrophosphate $Na_4P_2O_7$. I prefer, however, to use the glassy molecularly dehydrated alkali-metal phosphates and of these I perfer those members having properties substantially like sodium hexametaphosphate.

The term "molecularly dehydrated alkali-metal phasphate" is intended to include the metaphosphate, tripolyphosphate or pyrophosphate or mixtures of any of these phosphates. All of these molecularly dehydrated phosphates may be considered as derived from orthophosphates by the elimination of water of constitution. The molecularly dehydrated phosphates contain less water of constitution than the corresponding orthophosphates and have, therefore, come to be recognized as molecularly dehydrated phosphates, as pointed out more fully in the Hall and Jackson Patent 1,903,041, granted March 28, 1933.

Although the sodium salts are preferred, I may use the corresponding salts of the other alkali-metals, such as potassium or lithium.

Referring now more particularly to the accompanying drawings, the liquor obtained by soaking the beets in soaker 1, or the juice expressed from sugar cane is filtered in filter 2 and is then purified or defecated in a defecator 3. Lime is added to the defecator in order to coagulate the albuminoids and sulphur dioxide or other bleaching agent is added and the liquor is filtered in a filter 4. The filtered liquor is then evaporated, the evaporator illustrated in the drawings consisting of a quadruple effect evaporator having four effects 5, 6, 7 and 8. This evaporator is illustrated more in detail in Fig. 2. The sugar solution to be evaporated enters the first effect or vessel 5 through a pipe 10. The vessel 5 is provided with an upper header 11 and a lower header 12 through which pass tubes 13. Steam is led into the vessel through pipe 14 into the space 15 which surrounds the tubes 13 between the tube headers. The sugar solution indicated by the numeral 16 passes through the tubes 13 which are heated on their outside by the steam in compartment 15. The level of the sugar solution in the vessel 5 is indicated by the numeral 17. Each of the vessels or effects 6, 7 and 8 are similar in construction to the vessel 5 and need not be described in detail.

The steam entering vessel 5 through pipe 14 converts a certain amount of the water of the sugar solution into steam which passes through pipe 18 and is led into the steam compartment 15a of vessel 6. In vessel 6, the solution is further concentrated and the steam produced therein is led through pipe 18a to steam compartment 15b of the vessel 7. Similarly further concentration takes place in the vessel 7 and the steam issuing therefrom is passed through a pipe 18b to the steam compartment 15c of vessel 8. The steam coming from vessel 8 passes through a pipe 20 to a condenser 21 shown in Fig. 1a. This condenser maintains the vessels 8 and 7 under vacuum, the vacuum in vessel 8 being greater than that in vessel 7. The vessel 6 is kept at approximately atmospheric pressure, while vessel 5 is under a few pounds pressure. The arrangement is such that the decreased pressure on the sugar solution as it passes through the vessels 5, 6, 7 and 8 causes the evaporation in the different vessels by the steam led into each vessel from the preceding vessel.

The sugar solution passes between the vessels through the pipes 22, 22a and 22b and is discharged through pipe 22c to crystallizing pans where it precipitates as crystalline sugar. The condensate from the steam in compartments 15, 15a, 15b and 15c passes through pipes 23, 23a, 23b and is discharged through pipe 23c.

Since very little scale ordinarly forms in the first and second effects or bodies of the evaporator, I usually add the sodium hexametaphosphate or other molecularly dehydrated alkali-metal phosphate to the sugar liquor between the second and third effects in the amount found necessary, usually between about 2 P. P. M. and 10 P. P. M., based on the weight of the thin juice entering the first effect. When a quadruple effect evaporator is used, I have found it desirable to add an additional amount, usually between about 2 P. P. M. and 10 P. P. M. of the metaphosphate to the juice entering the fourth effect in addition to that added between the second and third effects. This is in crder to overcome the loss due to adsorption and reversion of the metaphosphate to orthophosphate.

In accordance with a modification of the above described process, I may add the sodium hexametaphosphate or other molecularly dehydrated alkali-metal phosphate to the condenser water used in condensing the steam from the last effect evaporator. Thus, as shown in Fig. 1a, the cooling water which is supplied to the cooling coil 25 in the condenser 21 is fed into the coil through a pipe 26. This cooling water may have added to it a few parts per million of molecularly dehydrated alkali-metal metaphosphate, for example 5 P. P. M. of sodium hexametaphosphate. The water passing through the cooling coil 25 condenses the steam entering the condenser through the pipe 20, thereby providing the vacuum in the evaporator vessels previously referred to. The water passing through coil 25 is heated in the condenser and is then passed through pipe 27 to the soaker 1 for treating a further quantity of sugar beets or sugar cane. The process then follows the cycle which has been previously described.

In some cases, it may be advisable to add a few parts per million of the molecularly dehydrated phosphate to the condenser water as well as to add a few parts per million of the molecularly dehydrated phosphate to the sugar solution between or during its stages of evaporation. In any event, the total of molecularly dehydrated alkali-metal phosphate which is added is only a few parts per million and is much less than the stoichiometric amount which would be required to precipitate the calcium in the sugar liquor.

Although I have illustrated and described one embodiment of the invention and various manners in which the process may be carried out, the invention may be otherwise practiced within the scope of the following claims.

I claim:

1. In the treatment of sugar solutions containing alkaline earth metal salts, the process of inhibiting the formation of scale on surfaces in contact with said solution during evaporation, which comprises providing in said solution an amount of molecularly dehydrated alkali-metal phosphate between about 2 P. P. M. and 10 P. P. M. based on the weight of the sugar solution entering the first effect evaporator.

2. In the treatment of sugar solutions containing alkaline earth metal salts, the process of inhibiting the formation of scale on surfaces in contact with said solution during evaporation, which comprises adding to the sugar solution between stages of evaporation thereof molecularly dehydrated alkali-metal phosphate in amount between about 2 P. P. M. and 10 P. P. M. based on the weight of the sugar solution entering the first effect evaporator.

3. In the treatment of sugar solutions containing alkaline earth metal salts, the process of inhibiting the formation of scale on surfaces in contact with said solution during evaporation, which comprises adding to the sugar solution between stages of evaporation thereof glassy molecularly dehydrated alkali-metal phosphate having a ratio of $Na_2O$ to $P_2O_5$ between 0.9:1 and 1.7:1, in amount between about 2 P. P. M. and 10 P. P. M. based on the weight of the sugar solution entering the first effect evaporator.

4. In the treatment of sugar solutions containing alkaline earth metal salts, the process of inhibiting the formation of scale on surfaces in contact with said solution during evaporation, which comprises adding to the condenser water used in condensing the steam from the evaporator an amount of molecularly dehydrated alkali-metal phosphate between about 2 P. P. M. and 10 P. P. M. based on the weight of the condenser water, and utilizing the thus treated condenser water in extracting sugar to make sugar solution which is to be evaporated.

5. In the treatment of sugar solutions containing alkaline earth metal salts, the process of inhibiting the formation of scale on surfaces in contact with said solution during evaporation, which comprises adding to the condenser water used in condensing the steam from the evaporator an amount of glassy molecularly dehydrated alkali-metal phosphate having a ratio of $Na_2O$ to $P_2O_5$ between 0.9:1 and 1.7:1 between about 2 P. P. M. and 10 P. P. M. based on the weight of the condenser water, and utilizing the thus treated condenser water in extracting sugar to make sugar solution which is to be evaporated.

6. In the treatment of sugar solutions containing alkaline earth metal salts, the process of inhibiting the formation of scale on surfaces in contact with said solution during evaporation, which comprises adding to the sugar solution during evaporation thereof, molecularly dehydrated alkali-metal phosphate in amount between about 2 P. P. M. and 10 P. P. M. based on the weight of the sugar solution entering the first effect evaporator.

7. In the treatment of sugar solutions containing alkaline earth metal salts, the process of inhibiting the formation of scale on surfaces in contact with said solution during evaporation, which comprises adding to the sugar solution during evaporation thereof, glassy molecularly dehydrated alkali-metal phosphate having a ratio of $Na_2O$ to $P_2O_5$ between 0.9:1 and 1.7:1, in amount between about 2 P. P. M. and 10 P. P. M. based on the weight of the sugar solution entering the first effect evaporator.

MARSHALL R. ALLEN.